United States Patent
Zagone et al.

(10) Patent No.: US 6,929,449 B2
(45) Date of Patent: *Aug. 16, 2005

(54) DIESEL ENGINE WATER PUMP WITH IMPROVED OIL CONTROL

(75) Inventors: John R. Zagone, Westmont, IL (US); Werner C. Duerr, Westchester, IL (US); Thomas J. Kane, Naperville, IL (US); Randal K. Albright, Montgomery, IL (US)

(73) Assignee: Electro-Motive Diesel, Inc., LaGrange, IL (US)

( * ) Notice: Subject to any disclaimer, the term of this patent is extended or adjusted under 35 U.S.C. 154(b) by 199 days.

This patent is subject to a terminal disclaimer.

(21) Appl. No.: 10/423,361

(22) Filed: Apr. 25, 2003

(65) Prior Publication Data

US 2004/0213667 A1 Oct. 28, 2004

(51) Int. Cl.[7] ................................................. F01D 1/02
(52) U.S. Cl. .................. 415/206; 415/110; 415/229
(58) Field of Search ............................. 415/203, 206, 415/229, 110, 111, 112

(56) References Cited

U.S. PATENT DOCUMENTS

| | | | |
|---|---|---|---|
| 2,977,042 A | * | 3/1961 | Jassinker .................... 415/206 |
| 3,429,268 A | * | 2/1969 | Camac et al. ............. 415/171.1 |
| 3,796,510 A | | 3/1974 | Korrenn et al .......... 415/170 A |
| 3,838,901 A | | 10/1974 | Sampatacos ................. 308/187 |
| 4,172,310 A | | 10/1979 | Mincuzzi ............... 29/156.4 R |
| 4,487,557 A | * | 12/1984 | Ruyak et al. ............... 417/420 |
| 6,099,243 A | * | 8/2000 | Fiore ........................ 415/111 |

FOREIGN PATENT DOCUMENTS

GB 2046372 A 11/1980

* cited by examiner

Primary Examiner—Hoang Nguyen
(74) Attorney, Agent, or Firm—Cook, Alex, McFarron, Manzo, Cummings & Mehler, Ltd.

(57) ABSTRACT

An improved diesel engine water pump includes three main features that aid in extending the maintenance-free life of the pump. The impeller shaft is carried by tapered roller shaft support bearings of which the impeller bearing has a floating outer race that is urged axially by a preload spring to provide a prescribed axial preload that maintains concentricity of the shaft with the axis and prolongs bearing life. An improved oil seal combines an oil slinger, a stationary deflector and a lip oil seal with a return passage to the engine to more effectively limit oil leakage from the pump. An improved water seal includes pressurized water jets fed from the pump volute that flush wear particles from the water seal surface and increase water seal life. Further details of these features are also disclosed.

6 Claims, 1 Drawing Sheet

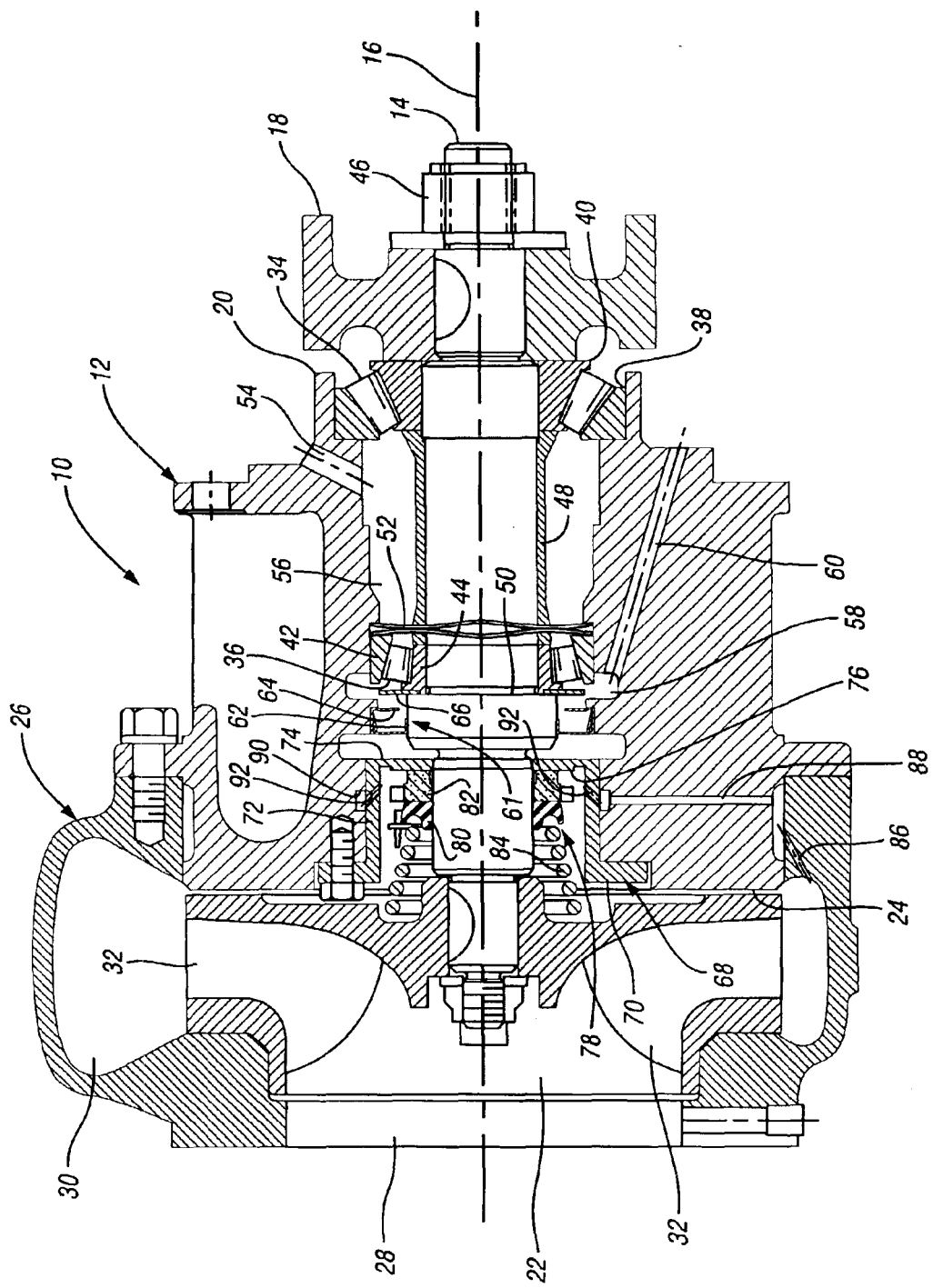

DIESEL ENGINE WATER PUMP WITH IMPROVED OIL CONTROL

TECHNICAL FIELD

This invention relates to water pumps of the centrifugal impeller type intended primarily for use in diesel engine cooling systems, especially for railroad locomotives, but also useful for other purposes.

BACKGROUND OF THE INVENTION

It is known in the art relating to diesel engine cooling systems to provide an engine with one or more centrifugal water pumps, each having a centrifugal flow or mixed flow impeller carried on a shaft and driven by a drive gear or other drive means. The shaft is supported on spaced bearings carried in a housing and lubricated by oil flow from the associated engine oil system. Both ball and roller bearings have been used in the past to carry rotary support loads and axial thrust forces acting on the shaft.

Oil passing through the impeller end bearing is returned to the engine oil sump through a drain line or passage in the water pump housing. A lip-type oil seal is conventionally utilized to prevent oil from passing along the shaft into the water impeller portion of the pump. Similarly, a conventional cartridge-type carbon water seal running against an annular seal surface has been used to prevent the escape of pressurized water from the impeller end of the pump into the oil lubricated portions.

SUMMARY OF THE INVENTION

The present invention provides an improved water pump construction including multiple features which combine to provide increased operating life for the supporting and wearing components of the pump.

The bearings utilized for support and thrust loads are preferably tapered roller-type bearings including a drive bearing at the drive gear end for accepting drive forces and major thrust loads developed in the impeller. An impeller tapered roller bearing is mounted in the housing toward the impeller end and includes an inner race spaced a fixed distance from the inner race of the drive bearing, the outer race of which is fixed in the pump housing.

The outer race of the impeller bearing is mounted to be axially slidable in the housing. A spring element, such as a wave spring, is mounted in the housing and biases the outer race in a direction to provide a controlled preload on the roller bearings. The spring maintains the bearings in a controlled preload condition which is sufficient to absorb minor reverse thrust loads which may occur in the pump. The preload increases bearing life by maintaining shaft concentricity and avoiding runout, or eccentric rotation of the shaft, which could increase bearing loads and generate wear problems.

A further feature is the additional of an oil slinger mounted on the inner race of the impeller bearing and adapted to centrifugally direct oil passing thorough the adjacent bearing into an annular collector groove. The groove carries the oil to the internal oil drain passage of the pump. Any oil escaping past the oil slinger contacts a deflector which also directs oil toward the oil drain passage. The deflector forms part of an oil seal including a conventional lip seal for preventing any remaining oil reaching the seal from passing through to the water side of the pump.

Still an additional feature of the improved water pump is a water seal which includes a stationary seal member mounted in the housing and having an annular seal surface formed on a radial wall. A rotatable seal member of conventional construction rotates with the impeller and engages the radial seal surface to prevent water from behind the impeller from escaping into the oil lubricated portion of the pump.

Seal life is improved by the addition of a seal flush arrangement which receives high pressure water from the pump volute at the outlet of the impeller and directs it through angled orifices or nozzles in a cylindrical wall of the stationary seal member. The nozzles spray pressure water against the outer portion of the seal surface to flush away particles of debris from seal wear. This reduces the collection of wear particles remaining on the seal surface and embedding in the seal. Removal of the wear particles thus increases the wear life of the seal.

These and other features and advantages of the invention will be more fully understood from the following description of certain specific embodiments of the invention taken together with the accompanying drawings.

BRIEF DESCRIPTION OF THE DRAWINGS

The single FIGURE of the drawing is a cross-sectional view along the longitudinal axis of the pump and illustrating the various improved features of a water pump according to the invention.

DESCRIPTION OF THE PREFERRED EMBODIMENT

Referring now to the drawings in detail, numeral 10 generally indicates a water pump of the centrifugal type adapted for use in diesel engine cooling systems or other suitable applications. Pump 10 includes a housing 12 containing a shaft 14 rotatable on an axis 16 extending through the housing. The shaft mounts a drive member in the form of a gear 18 that is carried adjacent a drive end 20 of the housing 12.

A centrifugal impeller 22 is mounted on an opposite end of the shaft adjacent an impeller end 24 of the housing. The impeller is contained within a volute 26 that is carried on the impeller end of the housing. The volute includes an axial inlet opening 28 and a radial outlet 30 to direct water or other coolant into vanes 32 of the impeller. These draw the water axially into the impeller and expel it radially into the associated volute for discharge to an external cooling system.

The pump shaft 14 is supported in the housing 12 by a pair of axially-spaced tapered roller bearings including a drive bearing 34 and an impeller bearing 36. The drive bearing 34 is designed to accept major rotational loads applied to the gear 18 as well as primary thrust loads resulting primarily from the axial flow of the water drawn in by the water pump and expelled radially. Bearing 34 includes an outer race 38 fixed within the housing 12 and an inner race 40 mounted on the shaft 14. The impeller bearing 36 carries primarily centrifugal loads and reverse thrust loads from the impeller, which are limited in force.

Bearing 36 also has an outer race 42 carried in the housing and an inner race 44 mounted on the shaft 14. The inner races 40, 44 of the bearings are fixed to the shaft along with the drive gear 18 by a nut 46 threaded on the shaft. The nut clamps the gear against the inner race 38 of the drive bearing 34 which in turn engages a spacer tube 48 that forces the inner race 44 of the impeller bearing against a shoulder 50 on the shaft. This fixes the spacing of the bearings and clamps them solidly in position on the shaft.

In accordance with the invention, the outer race 42 of the impeller bearing 36 is made axially slidable in the housing. A biasing element in the form of a wave spring 52 is mounted in the housing around the shaft and engages the housing and the drive end of the outer race 42 of the impeller. The spring biases race 42 axially toward the impeller and exerts a predetermined preload force against the outer race 42. This preloads both of the shaft bearings with a pre-selected axial thrust force.

The preload force is adequate to offset any reverse thrust forces which may be applied against the impeller bearing while the major thrust forces are taken up by the drive bearing 34 as previously described. The preload wave spring 52 thus provides a minimum thrust loading on the bearings which is adequate to avoid the development of any looseness or clearance in the bearing set and thus maintains the shaft in concentric rotation around the axis 16 within the housing 12. The development of any centrifugal forces on the bearings due to eccentric rotation of the shaft is thereby prevented so that bearing life is extended.

Bearings 34, 36 are lubricated within the housing by oil delivered through a feed passage 54. The passage receives lubricating oil from a lubricated portion of an associated engine on which the pump is mounted and directs the oil into an annular chamber or enclosure 56 from which it may lubricate both bearings. The impeller bearing 34 may also be lubricated by oil splash from the adjacent engine system which can also enter the enclosure 56 to lubricate the impeller bearing 36. Excess oil in the enclosure can escape either by passing through the drive bearing 34 into the adjacent engine enclosure, not shown, or by passing through the impeller bearing 36 into an annular collector groove 58. The groove 58 connects with a drain line or passage 60 that carries oil from the collector groove back to the associated engine oil system for return to the engine sump.

An oil control 61 is provided in order to prevent oil from escaping from the bearing enclosure 56 into the water side of the pump housing. The control may include a conventional lip seal 62 mounted in the housing for engagement of the seal lip with a seal surface of the shaft. To improve the operation of the seal, the invention includes a radial deflector 64 extending from the body of the lip seal and adapted to intercept oil splashed from the bearings and direct the oil downward into the oil collector groove 58 for draining to the engine system.

In addition, the pump oil control 61 includes a radial oil slinger 66 mounted on the impeller end of the impeller bearing inner race 44. The oil slinger 66 is positioned to centrifugally throw oil passing the bearing 36 and engaging the slinger into the collector groove 58, from which it is directed through passage 60 to the engine lubrication system.

The combination of the three elements provided by the oil control 61 provides a three fold arrangement for control of oil flow from the impeller bearing to the collector and out through the drain passage 60. The conventional lip seal forms a back up to limit the passage of any oil passing the first two elements, that is the oil slinger 66 and the deflector 64, from escaping into the water side of the pump.

In accordance with the invention, pump 10 includes an additional feature comprising an improved water seal assembly 68. Assembly 68 includes a stationary water seal member 70 which is mounted behind the impeller in the impeller end of the housing. Member 70 includes a cylindrical wall 72 closed at one end by a radial wall 74 having a radial seal surface 76 surrounding the shaft and facing toward the impeller end of the housing.

Within the stationary member 70, a rotatable water seal member 78 is mounted on the shaft 14. Member 78 includes a shaft seal 80 adjacent to a rotatable seal ring 82 that rotates with the impeller. The seal ring 82 has an end engaging the seal surface 76 for preventing water flow from the water side of the pump into the oil lubricated areas at the drive end of the housing. A conventional coil spring 84 extends between the impeller 22 and the shaft seal 80 and biases the seal ring 82 against the seal surface 76 to maintain a positive seal against leakage.

In accordance with the invention, pressurized water from the volute 26 is delivered, such as through passages 86 and 88 in the volute and housing respectively, to an annular groove or plenum 90. The plenum 90 connects with angled orifices or nozzles 92 extending thorough the cylindrical wall 72 of the stationary water seal member 70. The nozzles 92 are aimed in the direction of the radial seal surface 76.

In operation of the pump, rotation of the seal ring 82 against the water seal surface 76 causes wear particles of the ring to be dislodged from time to time and collect adjacent the ring 82 on the seal surface. The particles are dislodged and carried away from the seal surface by high pressure water spray which is directed from the volute supply source to the annular groove or plenum 90 and through the nozzles 92 against the seal surface surrounding the ring 82. The seal surface 76 is thereby maintained clear of wear particles which would otherwise collect around the surface and impair the wear life of the seal ring. Accordingly, the life of the seal ring is extended and longer maintenance-free operation of the water seal is provided.

In similar fashion, the oil control 61 of the pump, including the oil slinger 66, deflector 64 and lip seal 62, provides superior oil control which avoids the escape of lubricating oil into the water side of the pump. This extends the life of the lip oil seal to prevent leakage.

Finally, the wave spring 52, providing a predetermined thrust preload on the shaft support and thrust bearings 34, 36, maintains the shaft in fully concentric operation on its axis and thereby improves bearing life. As a result, a water pump having an extended operating life with reduced need for repair is provided by the present invention.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed is:

1. A water pump of the centrifugal type adapted for use in diesel engine cooling systems, the water pump comprising:
   a housing containing a shaft rotatable on an axis extending through the housing, the shaft mounting a drive member adjacent a drive end of the housing and a fluid impeller at an opposite impeller end of the housing;
   axially spaced drive and impeller bearings mounted in an oil lubricated recess and supporting the shaft in the housing, each bearing having an inner race fixed on the shaft and an outer race mounted in the housing, and
   an oil control in the lubricated recess and including an oil slinger mounted on the rotatable shaft adjacent the impeller bearing and operative to centrifugally direct oil from the impeller bearing into a collector connected with an oil return passage.

2. A water pump as in claim 1 wherein the oil control further includes a stationary oil seal having a deflector extending inward from the housing adjacent the oil slinger and operative to deflect bypassed oil into the return passage and a seal lip engaging the shaft and blocking the passage of bypassed oil along the shaft toward the fluid impeller.

3. A water pump as in claim 1 wherein the oil slinger is mounted on the inner race of the impeller bearing.

4. A water pump as in claim 3 wherein the oil control further includes a stationary oil seal having a deflector extending inward from the housing adjacent the oil slinger and operative to deflect bypassed oil into the return passage and a seal lip engaging the shaft and blocking the passage of bypassed oil along the shaft toward the fluid impeller.

5. A water pump an in claim 3 wherein:

the bearings are roller bearings;

the outer race of the impeller bearing is axially slidable in the housing; and a biasing clement is positioned between the housing and the outer race of the impeller bearing, the biasing element preloading the impeller bearing with a selected preload force maintained to maximize bearing life and concentric rotation of the shaft over all operating conditions of the pump.

6. A water pump as in claim 5 wherein the oil control further includes a stationary oil seal having a deflector extending inward from the housing adjacent the oil slinger and operative to deflect bypassed oil into the return passage and a seal lip engaging the shaft and blocking the passage of bypassed oil along the shaft toward the fluid impeller.

* * * * *